United States Patent Office 3,808,287
Patented Apr. 30, 1974

3,808,287
SILOXANE-ACRYLATE COPOLYMERS
Robert N. Thomas, Midland, Mich., assignor to Dow Corning Corporation, Midland, Mich.
No Drawing. Continuation-in-part of abandoned application Ser. No. 70,469, Sept. 8, 1970. This application June 1, 1972, Ser. No. 258,669
Int. Cl. C08f 11/04, 15/40
U.S. Cl. 260—827       5 Claims

ABSTRACT OF THE DISCLOSURE

Siloxane-acrylate copolymers having 3–5 weight percent acrylic or methacrylic functionality and sufficient aminoacrylate to neutralize about ¼ to ¾ of the acid functionality exhibit superior adhesion when used as coating compositions.

SPECIFICATION

This application is a continuation-in-part of my co-pending application Ser. No. 70,469, filed Sept. 8, 1970 now abandoned.

The present invention relates to siloxane-acrylate copolymers and aqueous emulsions thereof. In one aspect, the invention relates to coating compositions, particularly latex paints, which contain siloxane-acrylate copolymers and exhibit improved adhesion. In another aspect, the invention relates to construction materials having a protective coating containing novel siloxane-acrylate copolymers.

More specifically, the invention provides siloxane-acrylate copolymers consisting essentially of (a) 60 to 80 percent by weight of an acrylate selected from the group comprising hydrocarbon esters of acrylic acid, hydrocarbon esters of methacrylic acid, acrylic acid, methylacrylic acid and aminoacrylate; 3 to 5 weight percent of the acrylate being acrylic acid, methacrylic acid or mixtures thereof, said acrylate containing sufficient aminoacrylate to neutralize from about ¼ to ¾ of the acid functionality; and (b) 20 to 40 percent by weight of a siloxane consisting essentially of 45 to 65 mol percent $R_2SiO$ units and 35 to 55 mol percent $RSiO_{3/2}$ units wherein R is selected from the group consisting of hydrocarbon and substituted hydrocarbon radicals at least one of the R radicals being a vinylic radical, the ratio of vinylic radicals to silicon atoms in the siloxane being in the range of 0.02:1 to 0.1:1.

The acrylate component of the copolymer is selected from the group consisting of hydrocarbon esters of acrylic and/or methacrylic acid, the acids themselves and aminoacrylates. The major portion of the acrylate is composed of hydrocarbon esters acrylic and/or methacrylic acid. The ester derivatives containing from 1 to 8 inclusive carbon atoms are preferred. Specific examples of such compounds include methylacrylate, ethylacrylate, amylacrylate, cyclohexylacrylate, vinylacrylate, allylacrylate, benzoylacrylate, 2-ethylhexylacrylate, methylmethacrylate, ethylmethacrylate, butylmethacrylate and hexylmethacrylate. It is understood by those skilled in the art that either a single ester or various combinations of esters can be employed. The particular choice of acrylate(s) will be determined by the intended use of the copolymer. For example, methylmethacrylate by itself gives a hard and somewhat brittle product which is suitable for coating metal, whereas ethylacrylate by itself tends to give a soft sticky product which would find utility in treating textiles or formulating adhesives. When intermediate properties are desired, a blend of methylmethacrylate and ethylacrylate can be used to obtain a product having the right degree of hardness (or softness) and necessary amount of flexibility. It is preferred to employ a blend of the ester compounds in making the acrylate since it is seldom possible to find a single product which will give a product having the desired optimum properties for a particular application.

The acid functionality, derived from the copolymerization of acrylic and/or methacrylic acid, must be present in the acrylate in amounts in the range of from 3 to 5 weight percent. Amounts of acid acrylate less than 3 weight percent do not give increased adhesion in the siloxane-acrylate copolymer, while amounts of acid functionality greater than 5 weight percent do not appear to materially increase the benefits obtained by utilizing the stated range. In formulating latex paint compositions, copolymers utilizing the lesser amounts of acid (3 weight percent) are preferred because the desired low viscosity is obtained. A second condition to obtaining the increased adhesion is that the acrylate contain sufficient aminoacrylate to neutralize from about ¼ to ¾ of the acid functionality. Neutralization of ¼ of the acid gives improved cross-cut adhesion and a moderate increase in wet adhesion. Neutralization of about ½ of the acid gives greatly increased wet adhesion. Because wet adhesion is a highly desired characteristic in latex paint, copolymers in which about ½ the acid has been neutralized are preferred. The aminoacrylates used to partially neutralize the acid include those of the general formula

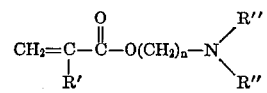

in which R' is a hydrogen atom or methyl radical, each R" is independently selected from the group consisting of the hydrogen atom and alkyl radicals of from 1 to 8 inclusive carbon atoms and $n$ is an integer having a value of from 1 to 8 inclusive. Dimethylaminoethyl methacrylate and t-butylaminoethyl methacrylate are preferred.

The siloxane used to make the copolymer is one composed of 45 to 65 mol percent $R_2SiO$ units and 35 to 55 mol percent $RSiO_{3/2}$ units. The R radicals in the siloxane units can be either hydrocarbon or substituted hydrocarbon radicals. Thus R can be, for example, an alkyl, alkenyl, alkylnyl, cycloalkyl, cycloalkenyl, aryl, alkaryl or an aralkyl radical; the halogen and cyano derivatives of the foregoing hydrocarbon radicals, or hydrocarbon radicals containing ether, thioether, ester or thioester linkages. Of course, no group which has a substituent which would interfere with the subsequent preparation of the copolymers should be employed. Specfic examples of the R radicals are the methyl, ethyl, propyl, butyl, amyl, dodecyl, octadecyl, myricyl, vinyl, allyl, hexenyl, ethynyl, propargyl, cyclobutyl, cyclohexyl, cyclohexenyl, phenyl, naphthyl, xenyl, tolyl, xylyl, mesityl, t-butylphenyl, benzyl, 2-phenylethyl, 2-phenylpropyl, 3-chloropropyl, 3,3,3-trifluoropropyl, chlorocyclohexyl, bromophenyl, dichlorophenyl α,α,α-trifluorotolyl, mercaptoethyl, mercaptopropyl, mercaptododecyl, cyanoethyl, cyanopropyl, hydroxypropyl, —$(CH_2)_3OOCCH=CH_2$, —$(CH_2)_3OOCC(CH_3)=CH_2$,
—$(CH_2)_3OCH_3$, —$(CH_2)_3OC_2H_5$, —$(CH_2)_3COOC_2H_5$, —$(CH_2)_3CH\overset{O}{\underset{}{\diagdown\diagup}}CH_2$, —$C_6H_4OCH_3$, —$(CH_2)_3C_6H_4OC_6H_5$ and

—$(CH_2)_2SC_2H_5$

It is preferred that the R radicals contain less than 10 carbon atoms, and the methyl, ethyl, vinyl, phenyl and 3,3,3-trifluoropropyl radicals are the most preferred at this time.

The siloxane-acrylate copolymer is prepared by vinyl copolymerization to form a type of grafted polymer. The siloxane units form a polymer "backbone" and the acrylate units are grafted thereto. In this type of copolymer it is essential that some of the R radicals are vinylic radicals. By "vinylic" radicals it is meant that they contain the structure $CH_2=C$ as a part of the radical. Examples of such groups are included above. The number of R radicals that are vinylic radicals must be such that the ratio of vinylic radicals to silicon atoms in the siloxane is in the range of 0.02–0.1:1. Generally speaking, the more vinylic groups present in the siloxane the less flexible the product. The ratio of vinylic radicals to silicon atoms employed in the copolymer is, of course, determined by the characteristics desired in the product.

Referring back now to the relative amounts of the $R_2SiO$ and $RSiO_{3/2}$ units in the siloxane, the exact proportions employed will again be determined by the properties desired in the copolymer. As a guide to the amounts to be used, the following considerations are noted. As the amount of $R_2SiO$ units is increased, the resulting acrylate-siloxane copolymers will be softer, stickier and exhibit higher dirt pickup. As the amount of $RSiO_{3/2}$ units is increased, the resulting acrylate-siloxane copolymer will be harder, drier and more brittle. By using the proper proportions of the two siloxane units one can impart the desired properties to the copolymer. It should be understood that the siloxane can also contain small amounts of $R_3SiO_{1/2}$ and $SiO_2$ units so long as their presence does not have a deleterious effect on the final copolymer.

One method for preparing the copolymers of this invention is as follows. The siloxane is first prepared by emulsion polymerization preferably starting with the appropriate alkoxysilanes. Then a free radical catalyst is added to the resulting siloxane emulsion and then the acrylate monomers, except the aminoacrylates, are added thereto and the siloxane and acrylate copolymerized, preferably under acidic conditions. The aminoacrylate is then added and copolymerized with the siloxane-acrylate product. Addition of the aminoacrylate as the last component to the emulsion polymerization avoids breaking of the emulsion. The best method, as it relates to the specific preferred copolymers, will be illustrated in detail in the examples.

Any catalyst can be employed which promotes the copolymerization of the siloxane and acrylate. The preferred compounds are the free-radical generating catalysts and catalyst systems. Specific examples of such catalysts include, the inorganic peroxides such as hydrogen peroxide, ammonium persulfate, potassium persulfate and the like; the various organic peroxy catalysts, such as the dialkyl peroxides, e.g. diethyl peroxide, diisopropyl peroxide, dilauryl peroxide, dioleyl peroxide, distearyl peroxide, di(tertiary-butyl)peroxide, di(tertiary amyl)peroxide, dicumyl peroxide and the like; the alkyl hydrogen peroxides such as tertiary butyl hydroperoxide, tertiary amyl hydroperoxide, cumene hydroperoxide, Tetralin hydroperoxide, the diisopropyl benzene hydroperoxide and the like; the symmetrical diacyl peroxides, for instance acetyl peroxide, propionyl peroxide, lauroyl peroxide, stearoyl peroxide, malonyl peroxide, succinoyl peroxide, phthaloyl peroxide, benzoyl peroxide; ketone peroxides such as methylethyl ketone peroxide, cyclohexanone peroxide, and the like; the fatty oil acid peroxides, such as coconut oil acid peroxides and the like; the unsymmetrical or mixed diacyl peroxides, such as acetyl benzoyl peroxide, propionyl benzoyl peroxide and the like; the azo compounds such as 2-azobis(isobutyronitrile), 2-azobis(2-methylbutyronitrile), 1-azobis(1-cyclohexancarbonitrile) and the like. Other free radical generating catalysts, such as the disulfides, can also be used.

The above description of the preparation of the copolymer outlines the essential steps in the process, while detailed descriptions of the preferred embodiments are set forth in the examples below.

These novel siloxane-acrylate copolymers can be cured to provide coatings which exhibit superior adhesion as compared to the adhesion obtained with known siloxane-acrylate copolymers, such as those disclosed in Canadian Pat. 842,947. Aqueous emulsions of the above-defined compositions are especially suitable as coating compositions. Generally the emulsions contain from 35 to 55 percent by weight of the copolymers. The aqueous emulsions can be formulated with pigment dispersions to provide latex paints. Pigments, such as titanium dioxide, iron oxide, phthalo green and the like can be used. The coating compositions of the invention can be applied by means of dipping, brushing, spraying and the like to construction materials, such as metals, plastics, wood, concrete, stone, paper, composition board and other cellulosic materials to provide a protective coating having excellent weathering characteristics. The copolymers of the invention can also be utilized in the formulation of sealant, adhesive and molding compositions.

In order that those skilled in the art may better understand how the present invention can be practiced, the following examples are given by way of illustration and not by way of limitation.

EXAMPLE 1

A mixture of 142 grams of siloxane emulsion (35 percent solids) of siloxane consisting essentially of 60 mol percent $(CH_3)_2SiO$ units, 38 mol percent $C_6H_5SiO_{3/2}$ units and 2 mol percent $CH_2=CHSiO_{3/2}$ units and 5.8 grams of an anionic surfactant in 162 ml. of water was placed in a closed flask and purged with nitrogen. A mixture of 87.5 grams of ethylacrylate, 37.5 grams of methylmethacrylate and 3.75 grams methacrylic acid was added to the siloxane emulsion with continuous stirring. A mixture of 0.25 gram of potassium persulfate and 0.2 gram of sodium sulfoxylate formaldehyde in 100 ml. of water was added to the mixture and the temperature was allowed to rise to 52° C.

After cooling to about 25° C., the same reactants and catalysts in the same amounts were added in the above-described sequence. In this second stage of the emulsion polymerization the temperature was allowed to rise to 48° C.

Tertiary-butylaminoethyl methacrylate (8.05 grams) was added to the siloxane-acrylate and the mixture was stirred for 30 minutes at 50° C., after which 0.2 gram of potassium persulfate was added to the emulsion. Copolymerization of the aminoacrylate was accomplished by heating the mixture for one hour at 70° C. After the reaction was complete, the emulsion of siloxane acrylate copolymer (32 percent solids) was cooled and the pH was adjusted to 8.4 with ammonium hydroxide.

An 8 mil wet film of the copolymer was cast from the above emulsion onto a metal panel. Wetting of the panel by the emulsion was excellent and after curing for 60 minutes at 25° C. the resulting film was completely clear.

EXAMPLE 2

A mixture of 316 grams of the 35% solids siloxane emulsion described in Example 1, 11.7 grams of anionic surfactant and 4 grams of 7 percent aqueous sodium bicarbonate in 140 grams of water was placed in a flask and purged with nitrogen. After heating to 60° C., 4 grams of solution of 0.5 gram of potassium persulfate in 20 ml. of water was added. At the same time, dropwise addition of a mixture of 176 grams of ethylacrylate, 76 grams of methyl methacrylate and 7.5 grams of methyl methacrylic acid was initiated. The reaction mixture was continuously stirred and the temperature maintained at 65° C. Three portions (4 grams) of the catalyst solution were added at 30 minute intervals. After 2 hours polymerization, the last 4 gram portion of potassium persulfate and an additional 3 drops of t-butyl hydroperoxide were added and the emulsion was heated to 90° C. for 30 minutes. The reaction mixture was then cooled to 30° C. and 8 grams of t-butylaminoethyl methacrylate was added. Five drops of t-butyl hydroperoxide and 0.2 gram of potassium persulfate were added and the aminoacrylate was allowed to react for one hour. There was no rise in temperature. An emulsion copolymer (48% solids) similar to that of Example 1 was obtained.

EXAMPLE 3

Utilizing the methods described in the preceding examples, siloxane-acrylate copolymers containing various amounts of methacrylic acid and t-butylaminoethyl methacrylate were prepared. All of the copolymers contained 70 weight percent acrylate and 30 weight percent siloxane resin consisting essentially of 60 mol percent $(CH_3)_2SiO$, 38 mol percent $(C_6H_5SiO_{3/2}$ and 2 mol percent $CH_2=CHSiO_{3/2}$. Aluminum panels were coated with emulsions (containing about 46% solids) of the individual copolymers at a 6 mil wet draw down and the coatings were cured for 24 hours at 75° F. Cross-cut adhesion to the panels was determined by making a series of parallel cuts through the film in one direction and a second series of cuts at right angles to the first. The cuts are preferably about 1/32 inch apart. Scotch tape was placed over the cross-cut area and then removed, the number of squares remaining intact gave a measure of adhesion. This test is described in detail in the Paint Testing Manual, Physical and Chemical Examination, Paints, Varnishes, Lacquers and Colors by Gardner and Sward, 12th ed., March 1962 at p. 160.

A pigment dispersion was made by mixing 240 grams of water, 7 grams of an anionic surfactant, 240 grams of titanium dioxide, 30 grams of mica, 62 grams of calcium carbonate, 45 grams of aluminum silicate, 15 grams of ethylene glycol, 15 grams of (1200 molecular weight) polyethylene glycol, 2 grams of methyl cellulose and 6.6 grams of a commercially available mildew preventative. The pigment dispersion was thoroughly mixed 490 grams of the siloxane-acrylate emulsions to form latex paints based on the various copolymers. Test panels were prepared priming cedar panels, allowing the primer to air dry for 7 days and spray coating the primed surface with a commercially available oil-base paint. The top coat was air-dried for three days at room temperature and further cured at 140° F. for three days to provide an artificially aged glossy surface. The latex paints were coated onto the test panels at a 4-mil thickness and allowed to air-dry for three days. "Wet adhesion" values were determined by soaking the panel in water for one hour and after blotting dry, testing for hardness with a standard Hoffman tester. The Hoffman hardness required to abrade the latex paint was taken as the measure of wet adhesion.

The copolymer composition as to the acrylate portion and the adhesion values for the various copolymeric coatings are given below.

on the unmodified siloxane-acrylates, as exemplified by copolymers 1 and 2 and modified copolymers which are not within the scope of the invention such as copolymers 3, 4, 8 and 9.

Reasonable modification and variation are within the scope of the invention which is directed to novel siloxane-acrylate copolymers.

That which is claimed is:

1. A siloxane-acrylate copolymer consisting essentially of
   (a) 60 to 80 percent by weight of an acrylate prepared by polymerization of monomers selected from the group consisting of hydrocarbon esters of acrylic acid, hydrocarbon esters of methacrylic acid, acrylic acid, methylacrylic acid and aminoacrylate; said aminoacrylate being of the formula

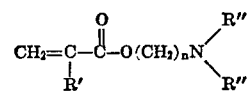

in which
   $R'$ is a hydrogen atom or a methyl radical,
   $R''$ is independently selected from the group consisting of the hydrogen atom and alkyl radicals of from 1 to 8 inclusive carbon atoms, and
   $n$ is an integer having a value of from 1 to 8 inclusive;
   3 to 5 weight percent of the acrylate being acrylic acid, methacrylic acid or mixtures thereof, said acrylate containing sufficient aminoacrylate to neutralize from about ¼ to ¾ of the acid functionality; and
   (b) 20 to 40 percent by weight of a siloxane consisting essentially of 45 to 65 mol percent $R_2SiO$ units and 35 to 55 mol percent $RSiO_{3/2}$ units wherein R is selected from the group consisting of hydrocarbon and substituted hydrocarbon radicals, said substituted hydrocarbon radicals containing halogen atoms, cyano groups, ether or thioether linkages and ester or thioester groups; at least one of the R radicals being a vinyl radical, the ratio of vinyl radicals to silicon atoms in the siloxane being in the range of 0.02:1 to 0.1:1.

2. A copolymer in accordance with claim 1 where in the siloxane the R radicals are selected from the group consisting of the methyl, ethyl, vinyl, phenyl and 3,3,3-trifluoropropyl radicals.

3. A copolymer in accordance with claim 2 wherein the acrylate contains sufficient aminoacrylate to neutralize from ¼ to ½ of the acid functionality.

|  | Composition of acrylate portion of siloxane-acrylate | | | | Adhesion | |
|---|---|---|---|---|---|---|
|  | Weight percent of— | | | | | Percent cross-cut adhesion before/after testing with tape |
| Copolymer No. | Ethyl-acrylate | Methyl-methacrylate | Methacrylic acid | Equivalent weight of t-BAEM [1] | Wet adhesion | |
| 1 | 70 | 25 | | (5 wt. percent) | 2 | 85/ |
| 2 | 70 | 25 | 5 | | 2 | 70/ |
| 3 | 70 | 29 | 1 | 1/4 | 2 | 80/ |
| 4 | 70 | 28 | 2 | 1/4 | 4 | 96/5 |
| 5 | 70 | 27 | 3 | 1/4 | 4 | 10/10 |
| 6 | 70 | 26 | 4 | 1/4 | 6 | 100/10 |
| 7 | 70 | 25 | 5 | 1/4 | 6 | 100/10 |
| 8 | 70 | 29 | 1 | 1/2 | 4 | 100/4 |
| 9 | 70 | 28 | 2 | 1/2 | 6 | 100/60 |
| 10 | 70 | 27 | 3 | 1/2 | 15 | 100/100 |
| 11 | 70 | 26 | 4 | 1/2 | 15 | 100/100 |
| 12 | 70 | 25 | 5 | 1/2 | 15 | 100/100 |

[1] t-Butylaminoethyl methacrylate.

These data demonstrate that the copolymers of the invention, such as copolymers 5, 6, 7, 10, 11 and 12, exhibit superior adhesion to that obtained with coatings based 4. The copolymer of claim 3 wherein the acrylate contains sufficient aminoacrylate to neutralize about ½ of the acid functionality.

5. The copolymer of claim 3 wherein the acrylate is a copolymer of ethylmethacrylate, methylmethacrylate, methacrylic acid and t-butylaminoethylmethacrylate.

References Cited
UNITED STATES PATENTS 3,575,910  4/1971  Thomas _____ 260—827
3,624,015  11/1971  Vaughn _____ 260—827
3,404,114  10/1968  Snyder et al. _____ 260—80.73

WILBERT J. BRIGGS, Sr., Primary Examiner

U.S. Cl. X.R.

117—148, 161 UN, 161 UC, 161 ZA; 260—29.2 M, 29.6 RW, 41 B, 29.6 HN, 41 A, 885, 46.5 UA, 901, 80.73